US005559203A

United States Patent [19]

Jensen

[11] Patent Number: 5,559,203
[45] Date of Patent: *Sep. 24, 1996

[54] POLYMER PRECURSORS FOR ALUMINUM NITRIDE

[75] Inventor: James A. Jensen, Hockessin, Del.

[73] Assignee: Lanxide Technology Company, LP, Newark, Del.

[*] Notice: The term of this patent shall not extend beyond the expiration date of Pat. No. 5,276,105.

[21] Appl. No.: 514,198

[22] Filed: Aug. 11, 1995

Related U.S. Application Data

[63] Continuation of Ser. No. 176,559, Jan. 3, 1994, Pat. No. 5,457,173, which is a continuation-in-part of Ser. No. 907,726, Jul. 2, 1992, Pat. No. 5,276,105, which is a continuation-in-part of Ser. No. 594,754, Oct. 9, 1990, abandoned.

[51] Int. Cl.$^6$ .................................................. C08G 79/00
[52] U.S. Cl. ............................ 528/9; 528/395; 423/412
[58] Field of Search ....................... 528/9, 395; 525/389; 423/412

[56] References Cited

U.S. PATENT DOCUMENTS

| | | | |
|---|---|---|---|
| 3,505,246 | 4/1990 | Ehrlich et al. | 260/2 |
| 4,032,553 | 6/1977 | Dozzi et al. | 528/9 |
| 4,064,153 | 12/1977 | Cucinella et al. | 528/9 |
| 4,128,567 | 12/1978 | Corbellini et al. | 528/9 |
| 4,687,657 | 8/1987 | Clark et al. | 423/412 |
| 4,696,968 | 9/1987 | Tebbe | 524/610 |
| 4,740,574 | 4/1988 | Bolt et al. | 528/9 |
| 4,767,607 | 8/1988 | Schleich | 423/412 |
| 4,783,430 | 11/1988 | Su | 501/96 |
| 5,041,512 | 8/1991 | Tebbe | 528/9 |

FOREIGN PATENT DOCUMENTS

| | | |
|---|---|---|
| 259164 | 3/1988 | European Pat. Off. |
| 331448 | 9/1989 | European Pat. Off. |
| 1215626 | 9/1986 | Japan |

OTHER PUBLICATIONS

L. V. Interrante et al., Inorganic Chem., 1989, 28, 252–257 and J. Electrochem. Soc. 1989, 136, 472–478.

L. Maya, Adv. Ceram. Mat., 1986, 1, 150–153.

L. I. Zakharkin and I. M. Khorlina, Bull. Acad. Sci. USSR, Engl. Transl. 1959, 523–524 and Proc. Acad. Sci. USSR, 1957, 116, 879.

Jiang and Interrante, *Chem. Mater.*, 2, pp. 439–446 (1990), "N,N'-Bis(tri–ethylaluminio)ethylenediamine– and N,N'-Bis(trimethylaluminio)ethylene–diamine–Derived Organometallic Precursors to Aluminum Nitride Syntheses, structures, and Pyrolyses".

*Chemical Abstracts*, vol. 53, No. 22, Nov. 25, 1959, Abstract No. 21734:d–f, "Thermal Decomposition of Addition Products of Diisobutyl–aluminum Hydride and Nitriles".

Proceedings of the Academy of Sciences of the U.S.S.R. Sec. Chemistry, vol. 112, Jan.–Feb. 1957, p. 523.

*Primary Examiner*—John C. Bleutge
*Assistant Examiner*—Randy Gulakowski

[57] ABSTRACT

An aluminum-nitrogen polymer is prepared by reacting an organic nitrile with a dialkylaluminum hydride to form an organoaluminum imine, and heating the imine to a temperature of 50° to 200° C. for at least 2 hours. The polymeric product can be subjected to an additional heat treatment to form a more highly cross-linked polymer. After either heat treatment the polymeric product can be further reacted with a primary amine or ammonia. The organoaluminum imine as well as the aminated or non-aminated polymers can be pyrolyzed to form an aluminum nitride-containing ceramic.

9 Claims, No Drawings

POLYMER PRECURSORS FOR ALUMINUM NITRIDE

This is a continuation of application Ser. No. 08/176,559 filed on Jan. 3, 1994, now U.S. Pat. No. 5,457,173 which was a continuation-in-part of U.S. Ser. No. 07/907,726, filed Jul. 2, 1992, which issued on Jan. 4, 1994, as U.S. Pat. No. 5,276,105, which was a continuation-in-part of U.S. Ser. No. 07/594,754, filed Oct. 9, 1990, and now abandoned.

FIELD OF THE INVENTION

This invention relates to polymer precursors for aluminum nitride. This invention particularly relates to aluminum-nitrogen polymers prepared from an organic nitrile and a dialkylaluminum hydride.

BACKGROUND OF THE INVENTION

Aluminum nitride (AlN) is a refractory material melting at 2400° C., which exhibits several unique chemical and physical properties, e.g., it has a density of 3.26 g/cm$^3$, a Young's modulus of 280 GPa, a flexural strength of 400 MPa and a Knoop hardness of 1200 kg/mm$^2$. AlN is very stable in the presence of molten metals and therefore can be used, for example, for making crucibles to hold molten metal.

Aluminum nitride is also an electrical insulator with a bandgap of 6.2 electron volts, which makes it an attractive alternative substrate material to replace alumina and beryllia in electronic packaging. The thermal expansion coefficient of AlN is nearly identical to that of silicon. This is an important property in high power applications where thermal distortion can occur between a silicon chip and the substrate due to a mismatch in the coefficients of thermal expansion of the two materials. The thermal conductivity of aluminum nitride is nearly ten times higher than alumina and approximately equal to that of beryllia. Unlike beryllia, aluminum nitride is not restricted by processing constraints because of its toxicity.

There is currently a great deal of interest in polymer precursor materials that can be pyrolyzed to yield ceramic materials, including aluminum nitride. Aluminum-nitrogen polymers containing no alkyl substitution on the aluminum or nitrogen atoms are described in U.S. Pat. No. 4,767,607, in which thermolysis of a mixture of aluminum chloride and hexamethyldisilazane results in formation of a polymer with the repeating unit —(Cl)Al—N(H)—$_n$. Pyrolysis of the polymer in ammonia or under vacuum yields crystalline AlN. An infusible polymeric aluminum amidimide —(NH$_2$)Al—N(H)—$_n$ that can be pyrolyzed to form AlN is described by L. Maya, *Adv. Ceram. Mat.*, 1986, 1, 150–153.

Polymers having the repeating unit —(R)Al—N(H)—$_n$ are disclosed in U.S. Pat. No. 4,696,968 and European Patent Application 259,164. Fibers can be melt spun from the thermoplastic precursor and pyrolyzed to AlN. L. V. Interrante et al., *Inorganic Chem.*, 1989, 28, 252–257 and *Mater. Res. Soc. Symp. Proc.*, 1986, 73, 359–366 reported the formation of volatile crystalline precursors that can be sublimed under vacuum. A two step pyrolysis of these precursors in ammonia resulted first in an insoluble aluminum imide polymer of the form —(R)Al—N(H)—$_n$ and ultimately AlN containing less than 0.5% residual carbon and oxygen. U.S. Pat. No. 4,783,430 discloses the formation of —(CH$_3$)Al—N(H)—$_n$, which can be pyrolyzed under helium, argon or vacuum to form hexagonal AlN.

Polymers having the repeating unit —(H)Al—N(R)—$_n$ are disclosed in U.S. Pat. No. 3,505,246 and are formed by the reaction of the alane adduct H$_3$Al—N(C$_2$H$_5$)$_3$ with a reagent such as acetonitrile. U.S. Pat. No. 4,687,657 discloses the preparation of a poly-N-alkyliminoalane that can be pyrolyzed in argon or under vacuum to form AlN.

Reacting an organic nitrile with diisobutylaluminum hydride produced organoaluminum imines having the formula RCH=NAl(i—C$_4$H$_9$)$_2$, which were not isolated (L. I. Zakharkin and I. M. Khorlina, *Bull. Acad. Sci. USSR, Engl. Transl.*, 1959, 523–524 and *Proc. Acad. Sci. USSR*, 1957, 112, 879). A gas containing 85% isobutene and polymers having the repeating unit

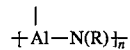

were produced on heating the organoaluminum imine to 220° to 240° C. During the formation of the polymer, aluminum alkyl groups of the organoaluminum imine are eliminated as isobutene, and aluminum-nitrogen bonds are formed.

European Patent Application 331,448 discloses that AlN can be deposited on a substrate by heating the substrate and contacting it with the vapor of an aluminum-nitrogen compound having the formula CH$_3$(R$^1$)Al—N(R$^2$)(C$_3$H$_7$), where R$^1$ is alkyl and R$^2$ is H, alkyl or aryl. A polymer of this compound is claimed, but the structure of the polymer is not disclosed.

SUMMARY OF THE INVENTION

A method has now been found for producing aluminum-nitrogen polymers in which at least some of the repeating units contain alternating aluminum and nitrogen atoms wherein each aluminum and nitrogen atom is substituted by an organic group.

The process for preparing an aluminum-nitrogen polymer according to the invention comprises (a) reacting an organic nitrile having the formula RCN, where R is a 1–12 carbon alkyl, cycloalkyl or aryl group, with a dialkylaluminum hydride having the formula R'R"RAlH, where R' and R" are the same or different 2–12 carbon alkyl groups, to form an organoaluminum imine and (b) heating the organoaluminum imine to a temperature of 50° to 200° C. for a period of at least 2 hours, with liberation of a gas comprising a mixture of saturated R'H and R"H hydrocarbons and unsaturated hydrocarbons derived from the alkyl groups R' and R" wherein the amount of saturated R'H and R"H hydrocarbon exceeds the amount of unsaturated hydrocarbons. The polymeric reaction product can then be heated at 200° to 400° C. to form a different, presumably more highly crosslinked, polymer. After either heat treatment the polymeric product can be further reacted with a primary amine or ammonia. The resulting transaminated polymer can be either fusible or infusible. By fusible is meant a polymer which is either a liquid, a solvent-soluble solid or a meltable solid. The organoaluminum imine as well as the aminated or non-aminated polymers can be pyrolyzed to form an aluminum nitride-containing ceramic.

DETAILED DESCRIPTION OF THE INVENTION

A single nitrile or a mixture of nitriles can be used in step (a) of the process of this invention. Suitable nitriles include, for example, acetonitrile, propionitrile, butyronitrile, benzonitrile, phthalonitrile, isophthalonitrile, terephthalonitrile, 1,4-dicyano-2-butene, dicyandiamide, adiponitrile and acrylonitrile.

The organoaluminum imine formed by the reaction of the organic nitrile and the dialkylaluminum hydride is typically a dimer that contains a heterocyclic core and has the structure

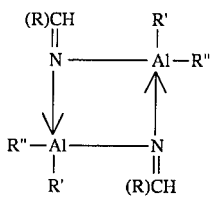

Depending on the nature of the substituents R, R' and R", the imine can also be in the form of a monomer or a higher cyclic oligomer. The exact form of the imine is dictated by the stearic and electronic properties of the substituents.

In the reactions described below, the notation for labeling the carbon atoms bonded to Al atoms will be the following:

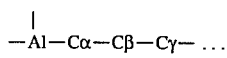

Likewise, a hydrogen atom bonded to a Cα carbon atom will be called an α hydrogen atom.

The polymers of this invention are prepared by maintaining the organoaluminum imine at a temperature in the range of 50° to 200° C. for a time sufficient so that the amount of R'H and R"H saturated hydrocarbons liberated in the formation of the polymer exceeds the amount of gaseous unsaturated hydrocarbon that is liberated. Both R'H and R"H alkane and olefin result from thermal decomposition of the R'—Al and R"—Al fragments of the organoaluminum imine during polymer formation.

The polymers of this invention are thus prepared by heating the organoaluminum imine described above to a temperature in the range of 50° to 200° C. for a period of at least 2 hours, preferably for a period of at least 3 hours, and more preferably for a period of at least 8 hours. The heating can be carried out with or without a solvent, although it is preferably carried out without a solvent. When the organoaluminum imine is heated for a period of less than two hours, no polymerization can be detected. Polymerization is indicated by the rapid evolution of gaseous by-products and a concomitant increase in viscosity from the original viscosity of the dimer. Since the polymerization is thermally driven, significant polymerization at temperatures of less than 200° C. but greater than 50° C. takes longer than the minimum time of two hours required at 200° C. The time needed to effect such polymerization at any given temperature in the range of 50° C. to 200° C. can be readily determined by one skilled in the art.

The following units comprise the major components of the polymer, although small amounts of other components can also be present:

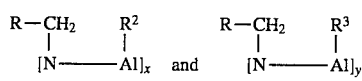

where R has the same meaning as described above. $R^2$ has the formula $C_nH_{2n+1}$, where n is 2–12 and is an unreacted alkyl group R' or R" on aluminum, introduced as part of the dialkylaluminum hydride. $R^3$ is an alkenyl group derived from $R^2$ in the process of heating the organoaluminum imine, e.g., the formation of isobutenyl groups from isobutyl groups in Path A of the reaction scheme illustrated below. $R^3$ has the formula $C_nH_{2n-1}$, where n is 2–12 and is the same as in $R^2$. X and y are each greater than zero. The value of x is identical with the relative mole fraction of unsaturated hydrocarbon derived from R' and R" that is liberated in the thermal polymerization of the organoaluminum imine. The value of y is identical with the mole fraction of R'H plus R"H saturated hydrocarbons that is liberated. The values of x and y depend upon the time of heating, the temperature of heating, and the structure of the aluminum hydride reactant used.

While not wishing to be bound by theory, the process of gas evolution in systems containing a γ-hydrogen atom on one of the organic groups bonded to aluminum is believed to proceed by the following mechanism, using a diisobutylaluminum imine as an example:

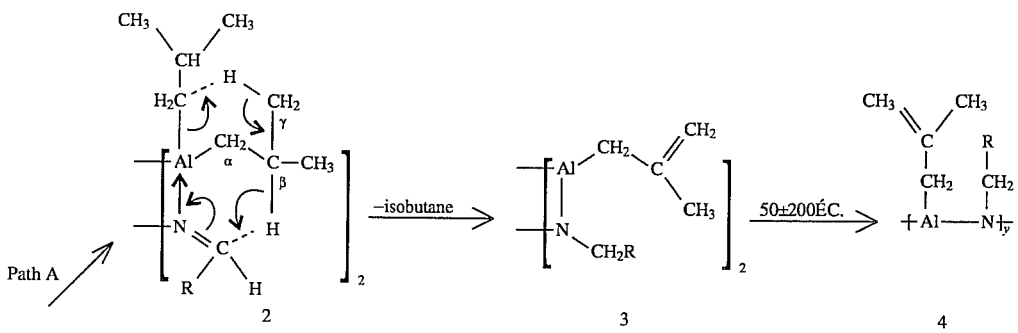

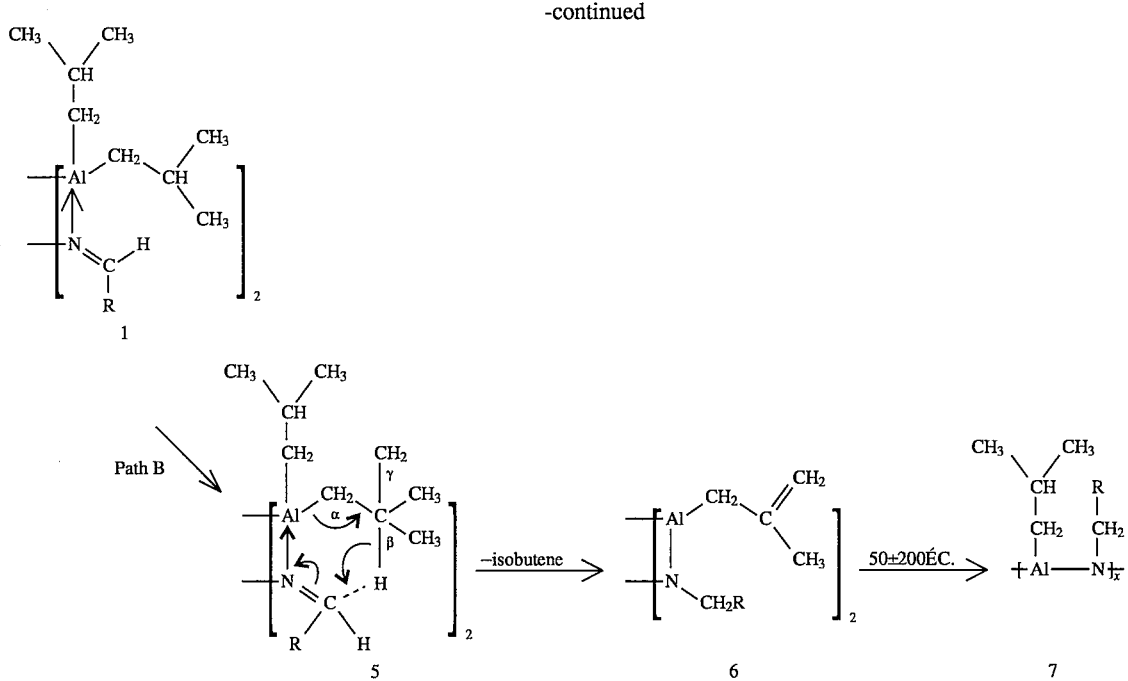

In this mechanism the coordinated imine in the starting dimer (1) is reduced in the process of β-hydride migration from a neighboring isobutyl group as shown in intermediate (2) in Path A. The imine reduction is accompanied by transfer of an acidic γ-hydrogen from the isobutyl group involved in imine reduction to the other aluminum-bonded isobutyl group. Six membered ring intermediates appear to be involved. Loss of alkane results in an isobutenyl intermediate (3). Thermal polymerization to give polymer (4) then occurs. In the case of diisobutylaluminum hydride, the butenyl groups formed as a result of the elimination reaction shown in Path A further react to give $C_8$ alkyl groups and higher through crosslinking reactions occurring at the sites of organounsaturation in the butenyl groups that are generated in the thermal polymerization reaction. This crosslinking reaction is confirmed by polymer hydrolysis/mass spectrometric studies, which detect isobutylene and $C_8$ hydrocarbons as decomposition products of hydrolysis.

Alternatively, β-hydride migration to reduce the coordinated imine can be accompanied by loss of alkene if Al—Cα bonds are broken in the process of β-hydride migration (5) (Path B).

While not wishing to be bound by theory, it appears that Path A is the kinetically favored polymerization pathway in the temperature range 50° to 200° C., while Path B is the kinetically favored polymerization pathway at temperatures greater than 200° C. This accounts for (1) the liberation of R' and R" mainly as R'H and R"H saturated hydrocarbons from the organoaluminum Amine when heating at a temperature between 50° to 200° C. for a period greater than 2 hours, and (2) concurrent formation of a polymer from the organoaluminum Amine wherein the number of y repeat units is greater than the number of x repeat units.

Heating the organoaluminum Amine at 50° to 200° C. initiates partial crosslinking of the polymer that is formed by addition reactions occurring at the sites of organounsaturation found in the $R^3$ groups. This is indicated by a substantial increase in the viscosity, e.g., from 15 to over 750,000 cp measured at 30° C. for the case where acetonitrile is reacted with diisobutylaluminum hydride. The viscosity of the aluminum-nitrogen polymer can therefore be controlled by varying the time and temperature of the heating cycle. Low temperatures and short heating times produce low viscosity polymers, while higher temperatures and longer heating times produce extremely viscous or solid polymers. For most applications, a material that is soluble or fusible is preferred.

Further heating of the aluminum-nitrogen polymer obtained as a result of the first heating step to a temperature of 200° to 400° C. results in further crosslinking and evolution of gaseous alkane as well as gaseous olefin. Crosslinking occurs through organounsaturated $R^3$ groups, as well as by the formation of new Al—N bonds to give sites in the polymer that contain Al atoms bonded to three, rather than two, nitrogen atoms. In the polymer that is produced by this additional heating step, at least some of the units are the same as those described above.

The aluminum-nitrogen polymer formed below 200° C., as well as the polymer formed by subsequently heating the first polymer to above 200° C., can be further dissolved in aprotic organic solvents such as hexane, toluene, xylene, or diethyl ether and treated with ammonia or a primary amine, $R^4NH_2$, wherein $R^4$ is a 1–12 carbon alkyl, cycloalkyl or aryl group, for a time sufficient to introduce HN— or $R^4N$-groups into the polymer by transamination with concomitant release of $RCH_2NH_2$ or by aluminum alkyl bond cleavage. The aluminum-nitrogen polymer can also be treated with a mixture of ammonia and a primary amine.

In the polymer produced upon treatment of the aluminum-nitrogen polymer with ammonia or a primary amine, at least some of the units comprise the following:

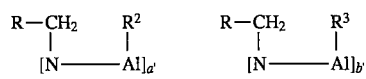

and

-continued

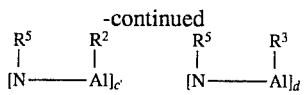

where R, $R^2$, and $R^3$ have the same meaning as described above $R^5$ is either H or $R^4$. The values of a, b, c and d depend upon the original values of x and y as well as the amount of ammonia or primary amine added. Preferably, the aminated polymers are fusible solids or viscous liquids rather than infusible solids and have a higher ceramic yield on pyrolysis compared to the non-aminated polymers. Fusible polymers are polymers which are either liquids, solvent-soluble solids or meltable solids. While the transaminated polymers of this invention can be either fusible or infusible, fusible polymers are preferred, since they offer greater flexibility in processing and handling than their corresponding infusible counterparts.

The aluminum-nitrogen polymers of this invention that contain an organic radical having a crosslinkable group, e.g., those derived from a nitrile such as acrylonitrile, can be crosslinked by supplying energy to generate free radicals. For example, the aluminum imine can be treated prior to or during heating with a radical source such as a peroxide. The aluminum imine can also be crosslinked by exposing the imine to UV light or electron beam radiation prior to or during heating. Alternatively, the cross-linkable group can be introduced by reaction of the aluminum-nitrogen polymer with an amine containing a crosslinkable group, e.g., allylamine.

An aluminum nitride-containing ceramic is produced by pyrolysis of any of the materials listed below in a non-oxidizing atmosphere such as nitrogen or ammonia. Pyrolysis in nitrogen is carried out at from about 800° to about 2200° C., preferably 1200° to 2000° C., and most preferably 1400° to 1700° C. Pyrolysis in ammonia can be accomplished at a temperature as low as about 600° C.

a. The organoaluminum imine formed by treating an organic nitrile with a dialkylaluminum hydride.

b. The polymer formed by heating the organoaluminum imine of (a) at 50° to 200° C. for at least 2 hours.

c. The polymer of (b) that has been further heated to a temperature between 200° and 400° C.

d. The polymer formed by treating the polymer of (b) with a primary amine or ammonia.

e. The polymer formed by treating the polymer of (c) with a primary amine or ammonia.

Aluminum nitride can be deposited on a substrate from the vapor phase by contacting the organoaluminum imine (a) with a substrate heated to the pyrolysis temperature.

The aluminum nitrogen polymers can be used in the preparation of ceramic fibers, films, coatings, and foams; in the infiltration of a preform structure and subsequent pyrolysis to produce a composite aluminum nitride-containing structure, as a thin film for electronic applications or as a binder for ceramic or metal powders.

EXAMPLE 1

A 250 ml Schlenk round bottom flask is fitted with a pressure equalized dropping addition funnel and purged. Acetonitrile (50 ml, 946 mmol) is added to the flask. The funnel is charged with diisobutylaluminum hydride (100 ml, 1.0M in toluene, 100 mmol) and the flask is cooled to 0° C. The diisobutylaluminum hydride is added dropwise over thirty minutes and stirred at 0° C. for an additional hour. The flask is warmed to room temperature and the colorless solution is stirred overnight. After about twelve hours a bright yellow color develops. The solvent is removed under vacuum, leaving 18 g of the aluminum imine $[CH_3C(H)=N—Al(i—C_4H_9)_2]_2$. The product is vacuum distilled at 87° C. at 0.35 torr. The product is characterized by proton NMR and IR spectroscopy.

The aluminum imine (5.0 g) is heated at 180° to 200° C. for eight hours. The gases evolved during the heating are shown by gas chromatography to be 72% isobutane and 28% isobutene. Throughout the heating the bright yellow color of the imine darkens toward a red-orange hue. The yield of polymer is 3.5 g. The viscosity of the liquid polymer is 52,000 cp at 30° C. measured with a Brookfield cone and plate viscometer. The pyrolysis yield is 14.1% measured by thermogravimetric analysis (25°–1000° C., 20° C./min., $N_2$). Within the carbon-13 NMR spectrum, peaks are observed at $\delta=39(CH_2)$ and $\delta=29(CH_3)$ characteristic of $CH_3CH_2N$— groups.

EXAMPLE 2

The polymer prepared as described in Example 1 (9.3 g) is dissolved in hexane (50 ml). Ammonia (0.95 l) is bubbled through the solution at room temperature for 9 minutes. The solution is stirred overnight. The solvent is removed under vacuum leaving 8.6 g of an orange solid product. The pyrolysis yield of this polymer is 32.8% measured by thermogravimetric analysis (25°–1000° C., 20° C./min., $N_2$)Infrared and NMR spectroscopy confirm the presence of $CH_3CH_2N$— as well as HN— groups on the polymer.

The polymeric product is pyrolyzed by heating in nitrogen from room temperature to 1500° C. to the rate of 10° C./min. and holding at 1500° C. for two hours to form crystalline AlN. The nature of the product is confirmed by X-ray diffraction.

EXAMPLE 3

The polymeric product prepared as described in Example 1 is pyrolyzed by heating in nitrogen from room temperature to 1500° C. at the rate of 10° C./min. and holding at 1500° C. for two hours to form crystalline AlN. The nature of the product is confirmed using X-ray diffraction.

EXAMPLE 4

The polymeric product prepared as described in Example 1 is pyrolyzed by heating in ammonia from room temperature to 600° C. at the rate of 10° C./minute and holding at 600° C. for two hours to form AlN. The nature of the product is confirmed using X-ray diffraction.

EXAMPLE 5

The polymer prepared as described in Example 1 (10.2 g) is dissolved in hexane (50 ml), and n-propylamine (10 ml, 121 mmol) is slowly added at 0° C. The solution is warmed to room temperature and stirred for 16 hours. The solvent is removed under vacuum to yield 9.5 g of a viscous liquid. The viscosity of the liquid polymer is 82,000 cp at 29° C. measured with a Brookfield cone and plate viscometer. The pyrolysis yield of this polymer is 38.9% measured by thermogravimetric analysis (25°–1000° C. at 20° C./min., $N_2$).

The polymeric product is then pyrolyzed by heating in nitrogen from room temperature to 1500° C. at the rate of 10° C./min. and holding at 1500° C. for two hours to form crystalline AlN. The nature of the product is confirmed using X-ray diffraction.

EXAMPLE 6

The structure of the polymer units (4) and (7) in the reaction scheme described in the "Detailed Description of the Invention" is verified as follows.

A sample of the polymer prepared as described in Example 1 (0.17 g) is charged to a glass vessel under argon. Degassed distilled water (4 ml) is added. The vessel is sealed to allow the gas headspace to be sampled. Gas evolution from the polymer is apparent. Gas chromatography/mass spectrometry reveals isobutane, isobutene and a $C_8$ hydrocarbon in the gas headspace. The presence of isobutane is evidence that unreacted alkyl ($R^2$) is present on the aluminum atom in polymer unit (7). The presence of isobutene as well as $C_8$ hydrocarbon is evidence that unsaturated alkyl ($R^3$) is present on the aluminum atom in polymer unit (4). The aqueous phase is shown by proton nuclear magnetic resonance spectroscopy to contain ethylamine as the only amine species present.

EXAMPLE 7

A 500 ml Schlenk round bottom flask is fitted with a pressure equalized dropping addition funnel and purged. Benzonitrile (19.2 ml, 188 mmol) and toluene (50 ml) are added to the flask. The funnel is charged with diisobutylaluminum hydride (150 ml, 1.0M in toluene, 150 mmol) and the flask is cooled to 0° C. The diisobutylaluminum hydride is added dropwise over 90 minutes, stirred at 0° C. for an additional 30 minutes, warmed to room temperature and stirred for sixteen hours. After the addition a clear yellow solution results. The solvent is removed under vacuum. The yield is 34.1 g of an aluminum imine compound $[C_6H_5C(H)=N-Al(i-C_4H_9)_2]_2$.

The aluminum imine compound prepared as described above (32.2 g) is heated to 180° to 200° C. under nitrogen for eight hours. The volatile products evolved during the heating are shown by gas chromatography to contain 44% isobutene and 56% isobutane. During the heating the yellow color of the imine darkens to a red-brown hue. The resulting polymer is a viscous liquid at room temperature. The yield of polymer is 25.8 g. Within the carbon-13 NMR spectrum, peaks are observed at $\delta=39(CH_2$ group) and $\delta=127(C_6H_5$ group) characteristic of $C_6H_5CH_2N-$ groups. The viscosity of the liquid polymer is 148,000 cp measured at 34° C. with a Brookfield cone and plate viscometer. The pyrolysis yield is 35.7% as measured by thermogravimetric analysis (25°–600° C., 20° C./min., $N_2$).

EXAMPLE 8

The polymer product prepared as described in Example 7 is pyrolyzed by heating in nitrogen from room temperature to 1500° C. at a rate of 10° C./min. and holding at 1500° C. for two hours to form crystalline AlN. The nature of the product is determined by X-ray diffraction.

EXAMPLE 9

The polymer prepared as described in Example 7 (10.9 g) is dissolved in 50 ml hexane. The solution is treated with ammonia (0.66 l) for seven minutes. The solution is stirred overnight. The solvent is then removed under vacuum leaving 8.3 g of a yellow solid. The pyrolysis yield of this polymer is 33.5% as measured by thermogravimetric analysis (25°–1000° C., 20° C./min., $N_2$). Infrared and NMR spectroscopy confirm the presence of $C_6H_5CH_2N-$ as well as HN— groups on the polymer.

The polymer is pyrolyzed by heating in nitrogen from room temperature to 1500° C. at a rate of 10° C./min. and holding at 1500° C. for two hours to form crystalline AlN. The nature of the product is confirmed by X-ray diffraction.

EXAMPLE 10

This example describes a chemical vapor deposition process for depositing AlN on a substrate. A sample reservoir equipped with inlet and outlet valves and charged with 10 g $[CH_3C(H)=NAl(i-C_4H_9)_2]_2$, prepared by the method described in Example 1, is connected to a mullite tube positioned in a furnace. Substrate coupons of alumina and silicon are positioned in the tube in the region occupying the hot zone of the furnace. With the reservoir valves closed, the tube is purged with nitrogen and heated to 500° C. The sample reservoir valves are opened allowing the nitrogen carrier gas to pass through the solution. The sample reservoir is heated to 100° C. The nitrogen carrier gas transports the aluminum imine to the furnace hot zone where the aluminum imine thermally decomposes and AlN deposits on the substrates. The film deposited at 500° C. is annealed in nitrogen at 1500° C. The resulting ceramic film is shown to be crystalline AlN by X-ray diffraction.

EXAMPLE 11

The polymer prepared as described in Example 1 (15.8 g) is further heated under nitrogen to a temperature of 250° C. for 4 hours. The volatile products evolved during the heating are shown by gas chromatography to be 37% isobutane and 63% isobutene. The resulting polymer, isolated in 13.1 gram yield, is an extremely viscous liquid of viscosity greater than 750,000 cp measured at 30° C. The pyrolysis yield as measured by thermogravimetric analysis (25°–600° C., 20° C./min., $N_2$) is 49.3%.

The polymer is pyrolyzed by heating in nitrogen from rood temperature to 1500° C. at a rate of 10° C./min. and holding at 1500° C. for two hours. The resulting ceramic is shown to be crystalline AlN by X-ray diffraction.

EXAMPLE 12

Five, 5.0 g samples of $[CH_3C(H)-N-Al(i-C_4H_9)_2]_2$ were prepared as described in Example 1 and heated in an oil bath under a nitrogen atmosphere at 180° to 200° C. for periods of time ranging from 20 minutes to 3 hours. The samples were cooled to room temperature and the viscosity (3 readings per sample) of each sample was measured at 25 C using a Brookfield cone and plate viscometer.

| Time of Heating (min) | Average Viscosity (cp) |
| --- | --- |
| 0 | 14 |
| 20 | 16 |
| 30 | 16 |
| 60 | 16 |
| 120 | 30 |
| 180 | 55 |
| 480 | 52,000 |

As can be seen from the data, the onset of significant polymerization of the organoaluminum imine dimer as indicated by a viscosity increase occurred after an initial heating period of at least 2 hours. Accelerated polymerization was observed at 3 hours heating time. The viscosity reading for the polymer prepared as described in Example 1, which was heated in identical fashion but for a period of 8 hours, is also provided in the table. At 8 hours heating time a very viscous polymer was produced, indicating the presence of a higher molecular weight material. The non-linear build-up in viscosity is indicative of a time-dependent increase in molecular weight.

EXAMPLE 13

The polymer prepared as An Example 1 (5 grams) was dissolved in hexane (50 ml). Excess ammonia was bubbled through the solution at 25° C. using a submerged needle. The ammonia flow was stopped after 2.5 hours and the solvent was removed under vacuum to yield a yellow solid. The solid was soluble in toluene, diethyl ether, and tetrahydrofuran. Pyrolysis yield of the transaminated polymer as measured by Thermal Gravimetric Analysis (25°–1000 C, 20 C/minute, $N_2$) was 32.8 wt. %.

I claim:

1. A polymer prepared by a process comprising (a) reacting an organic nitrile having the formula RCN, where R is a 1–12 carbon alkyl, cycloalkyl or aryl group, with a dialkylaluminum hydride having the formula R'R"AlH, wherein R' and R" are the same or different 2–12 carbon alkyl groups, to form an organoaluminum imine, (b) heating the organoaluminum imine to a temperature of about 50° to 200° C. for a period of at least 2 hours, with liberation of a gas comprising a mixture of saturated R'H and R"H hydrocarbons and unsaturated hydrocarbons derived from the alkyl groups R' and R", wherein the amount of saturated R'H and R"H hydrocarbons exceeds the amount of unsaturated hydrocarbons in said liberated gas, and (c) reacting the aluminum-nitrogen polymer that is formed in step (b) with a 1–12 carbon alkyl, cycloalkyl or aryl primary amine or ammonia to prepare a transaminated aluminum-nitrogen polymer.

2. The polymer of claim 1 wherein said transaminated aluminum-nitrogen polymer comprises a fusible polymer.

3. The polymer of claim 1 wherein the reaction in step (c) is performed at a temperature of less than about 50° C.

4. A transaminated aluminum-nitrogen polymer prepared by reacting a polymer comprising the repeat units:

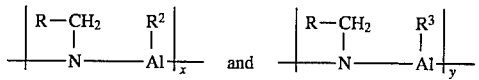

wherein R is a 1–12 carbon alkyl, cycloalkyl or aryl group, $R^2$ is an alkyl group having the formula $C_nH_{2n+1}$, where n is 2–12, $R^3$ is an alkenyl group derived from $R^2$ and having the formula $C_nH_{2n-1}$, where n is 2–12 and is the same as in $R^2$, y and x are each greater than 0 and y is greater than x, with ammonia or a 1–12 carbon primary alkyl, cycloalkyl or aryl amine. $R^4NH_2$, wherein $R^4$ is a 1–12 carbon alkyl, cycloalkyl or aryl group, said transaminated aluminum-nitrogen polymer comprising the repeat units:

 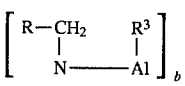

and

 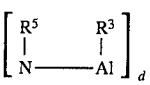

wherein R, $R^2$ and $R^3$ are defined as above, and $R^5$ is H or $R^4$ and further wherein x and y are each greater than zero and a, b, c, and d are each greater than or equal to zero with the proviso that at least one of a and b is not zero, and wherein the values of a, b, c and d depend upon the original amounts of x and y and the amount of said ammonia or said 1–12 carbon primary alkyl, cycloalkyl or aryl amine added in the transamination reaction.

5. The transaminated aluminum-nitrogen polymer of claim 4, wherein said polymer comprises a fusible polymer.

6. The transaminated aluminum-nitrogen polymer of claim 4 wherein $R^2$ comprises an isobutyl group and $R^3$ comprises an isobutenyl group.

7. The transaminated aluminum-nitrogen polymer of claim 4 wherein $R^5$ comprises H.

8. The transaminated aluminum-nitrogen polymer of claim 4 wherein $R^5$ comprises an isopropyl group.

9. An aluminum-nitrogen polymer prepared by reacting a polymer comprising the repeat units:

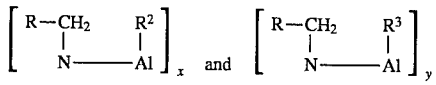

where R is a 1–12 carbon alkyl, cycloalkyl or aryl group, $R^2$ is a 1–12 carbon alkyl group and $R^3$ is an alkenyl group derived from $R^2$ and having the formula $C_nH-2_{n-1}$, where n is 2–12 and is the same as in $R^2$, with ammonia or a primary amine having the formula $R^4NH_2$ where $R^4$ is a 1–12 carbon alkyl, cycloalkyl or aryl group, said aluminum-nitrogen polymer comprising the repeat units:

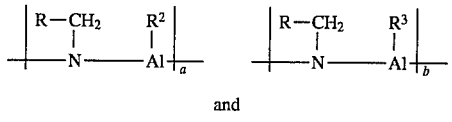

and

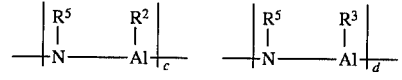

where R, $R^2$, $R^3$ and $R^4$ are defined as above, and $R^5$ is H or $R^4$, and further wherein x and y are each greater than zero and a, b, c and d are each greater than or equal to zero, with the proviso that at least one of a and b is not zero.

* * * * *